(12) United States Patent
  Guillemant et al.

(10) Patent No.: US 11,549,462 B2
(45) Date of Patent: Jan. 10, 2023

(54) TURBOJET ENGINE NACELLE INCLUDING A SINGLE MOVABLE FRAME OF A CASCADE THRUST REVERSER AND PASSAGES OF ANCILLARIES

(71) Applicants: Safran Nacelles, Gonfreville l'Orcher (FR); Safran Aircraft Engines, Paris (FR)

(72) Inventors: Sébastien Michel Thierry Guillemant, Gonfreville l'Orcher (FR); Pierre Caruel, Moissy Cramayel (FR); Olivier Kerbler, Gonfreville l'Orcher (FR); Alexis Heau, Gonfreville l'Orcher (FR); Mathieu Lerouvreur, Gonfreville l'Orcher (FR); Antoine Elie Hellegouarch, Moissy-Cramayel (FR)

(73) Assignees: Safran Nacelles, Gonfreville l'Orcher (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/884,948

(22) Filed: May 27, 2020

(65) Prior Publication Data
  US 2021/0003096 A1    Jan. 7, 2021

Related U.S. Application Data

(63) Continuation of application No. PCT/FR2018/053007, filed on Nov. 27, 2018.

(30) Foreign Application Priority Data

Nov. 27, 2020  (FR) .................................... 17/61239

(51) Int. Cl.
  *F02K 1/72*  (2006.01)
  *F01D 9/06*  (2006.01)

(52) U.S. Cl.
  CPC ............... *F02K 1/72* (2013.01); *F01D 9/065* (2013.01); *F05D 2260/60* (2013.01)

(58) Field of Classification Search
  CPC ..... F02K 1/72; F02K 1/80; F02K 1/82; F01D 9/065; F05D 2260/60; F05D 2260/602
  See application file for complete search history.

(56) References Cited

U.S. PATENT DOCUMENTS

| 4,044,973 A | * | 8/1977 | Moorehead | ............ B64D 27/20 244/54 |
| 2012/0104162 A1 | | 5/2012 | West | |

(Continued)

FOREIGN PATENT DOCUMENTS

| FR | 2907098 | 4/2008 |
| FR | 3031727 | 7/2016 |
| FR | 3038587 | 1/2017 |

OTHER PUBLICATIONS

International Search Report for international application PCT/FR2018/053007, dated Mar. 1, 2019.

*Primary Examiner* — Andrew H Nguyen
(74) *Attorney, Agent, or Firm* — Burris Law, PLLC

(57) ABSTRACT

A turbojet engine nacelle having a cascade-type thrust reverser includes a movable frame surrounding a cold air flow path, guided axially by longitudinal rails fixed to an intermediate casing surrounding the cold air flow path and supporting cascades of thrust-reversal guide vanes and mobile rear cowls. The nacelle has a passage of ancillaries opening radially towards the outside of the movable frame, in a zone with no bearing structure passing radially across the cold air flow path. The movable frame is cut in an axial plane at the passage for the passage of ancillaries, and each edge of the cut of the movable frame is connected to the (Continued)

intermediate casing by a slide rail fitted on a longitudinal rail arranged each on one side of this passage.

11 Claims, 3 Drawing Sheets

(56) References Cited

U.S. PATENT DOCUMENTS

2013/0220435 A1\* 8/2013 James .................... B64D 29/08
137/15.1
2016/0160799 A1 6/2016 Gormley \* cited by examiner

TURBOJET ENGINE NACELLE INCLUDING A SINGLE MOVABLE FRAME OF A CASCADE THRUST REVERSER AND PASSAGES OF ANCILLARIES

CROSS-REFERENCE TO RELATED APPLICATIONS

This application is a continuation of International Application No. PCT/FR2018/053007, filed on Nov. 27, 2018, which claims priority to and the benefit of FR 17/61239 filed on Nov. 27, 2017. The disclosures of the above applications are incorporated herein by reference.

FIELD

The present disclosure relates to a nacelle for a turbojet engine, including a cascade thrust reverser delivering a forward cold air flow.

BACKGROUND

The statements in this section merely provide background information related to the present disclosure and may not constitute prior art.

The turbojet engines for motorizing aircraft disposed in a nacelle, receive fresh air coming from the front side, and reject, from the rear side, the hot gases resulting from the combustion of the fuel delivering a thrust.

For the bypass turbojet engines, fan blades disposed around the motor generate a significant secondary flow of cold air along an annular flow path passing between this motor and the nacelle, which adds a high thrust.

Some nacelles include a thrust reverser system which at least partially closes the annular flow path of cold air, and rejects the secondary flow radially outwardly by directing it forward in order to generate a braking reverse thrust of the aircraft.

A known cascade thrust reverser type, presented in particular by U.S. Patent Publication No. 2016/0160799, includes rear movable cowls sliding axially outwardly under the effect of cylinders, to open lateral air passages on the nacelle containing cascades.

The rear cowls, by moving back on longitudinal guide rails, drive the cascades which are positioned in the lateral air passages. Closing flaps at least partially close the secondary flow by conveying this flow towards the cascades which reverse the thrust.

The nacelles generally include a passage of ancillaries, such as pressurized fluid pipes, drains or electric cables, which should pass by coming from the motorization through a movable circular frame forming a substantially cylindrical closed contour supporting the thrust reverser cascades. The movable frame is guided by longitudinal rails disposed between the cascades, fastened on an intermediate casing surrounding the cold air flow path.

On some nacelles, opposite to an engine pylon carrying the propulsion unit composed of the turbojet engine and the nacelle, generally positioned in the upper portion, also called the 12 o'clock position, a fixed support structure, which carries outwardly rails for guiding two movable half-frames, is disposed. Each movable half-frame carries a symmetrical half-cowl of a thrust reverser having, in a cross section, a "D" shape, (called "D-Duct").

In this case, the fixed support structure passing radially through the annular flow path allows a passage of different ancillary connections such as pressurized fluid pipes, drains or electric cables, to open between the half-cowls, in particular downwards opposite to the engine pylon.

However, the support structure passing through the annular flow path increases the aerodynamic losses of this type of nacelle.

On other nacelles, a single movable frame is available, forming the complete rotation of the nacelle, whose cowl has, in a cross section, a "C" shape (called "C-Duct"), or an "O" shape (called "0-Duct"), comprising in a plane perpendicular to the axis of the nacelle a single opening for passing the engine pylon.

The single movable frame generally carries two half-cowls, allowing opening them to perform the maintenance in the nacelle. The absence of a lower support structure passing through the cold air flow path reduces the aerodynamic losses.

In this case, a passage of ancillaries radially through the movable frame, outside the area for fastening the engine pylon where the movable frame is open, which can be in the 6 o'clock position, in the 12 o'clock position or in any angular position, poses passage issues. In particular, the motorization may include drains for discharging fluids, which must open at the 6 o'clock position to be in a low position for discharging these fluids.

It would then be necessary, in order to pass the ancillaries, to provide a radial bore in the movable circular frame supporting the thrust reverser cascades and the cowls. However, with a stroke of this movable frame greater than its axial length, it is then necessary to entirely section this frame in an axial plane (that is to say in a plane containing the axis of the nacelle) in order to allow the passage, which greatly decreases its rigidity.

SUMMARY

This section provides a general summary of the disclosure and is not a comprehensive disclosure of its full scope or all of its features.

The present disclosure provides a nacelle for a turbojet engine including a cascade thrust reverser comprising a movable circular frame surrounding a cold air flow path, guided axially by longitudinal rails fastened on an intermediate casing surrounding the cold air flow path, and supporting thrust reverser cascades and movable rear cowls, this nacelle having a passage of ancillaries opening radially outwardly of the movable frame, in an area including no support structure passing radially through the cold air flow path, being remarkable in that the movable frame is cut in an axial plane at the passage of the ancillaries, and in that each edge of this section of the movable frame is connected to the intermediate casing by a slide rail adjusted on a longitudinal rail each disposed on one side of this passage of ancillaries.

An advantage of this nacelle is that each edge of the section of the movable frame is rigidly connected by the longitudinal rail to the intermediate casing, which gives this movable frame a rigidity despite its section allowing the passage of ancillaries.

A significant rigidity of the movable frame is obtained in a compact simple manner and with reduced components allowing keeping a reduced mass.

The nacelle according to the present disclosure may further include one or more of the following features, which can be combined with each other.

According to one form, the nacelle includes a fixed shutter plate closing the space between the two rails receiving the slide rail.

In this case, advantageously the shutter plate includes a bore receiving the passage of the ancillaries.

In particular, the shutter plate can extend relative to the rear of the cascades by a distance equal to the stroke of said movable frame.

In addition, the rear of the movable cowls may have an opening forming a passage receiving the rear end of the shutter plate when the thrust reverser is closed.

Advantageously, the thrust reverser being open, the thrust reverser cascades are adjusted on the slide rails and the shutter plate is adjusted between these slide rails, so as not to have a cold air radial passage outside these thrust reverser cascades.

According to another form, the nacelle includes a fixed outer fairing disposed rearward of the passage of the ancillaries, which is adjusted on the outer shape of the rear cowls.

Said shutter plate and said fixed outer fairing may form a single piece.

Advantageously, the rear cowls include a forwardly open longitudinally elongated window receiving, in an adjusted manner, the outer fairing when the thrust reverser is closed.

Advantageously, the nacelle includes connecting rods passing radially inside the outer fairing and longitudinal rails, each connecting two locks each fastened on the end of a rear cowl.

In particular, the passage of the ancillaries may include drains for discharging fluids, disposed vertically at the bottom of the nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
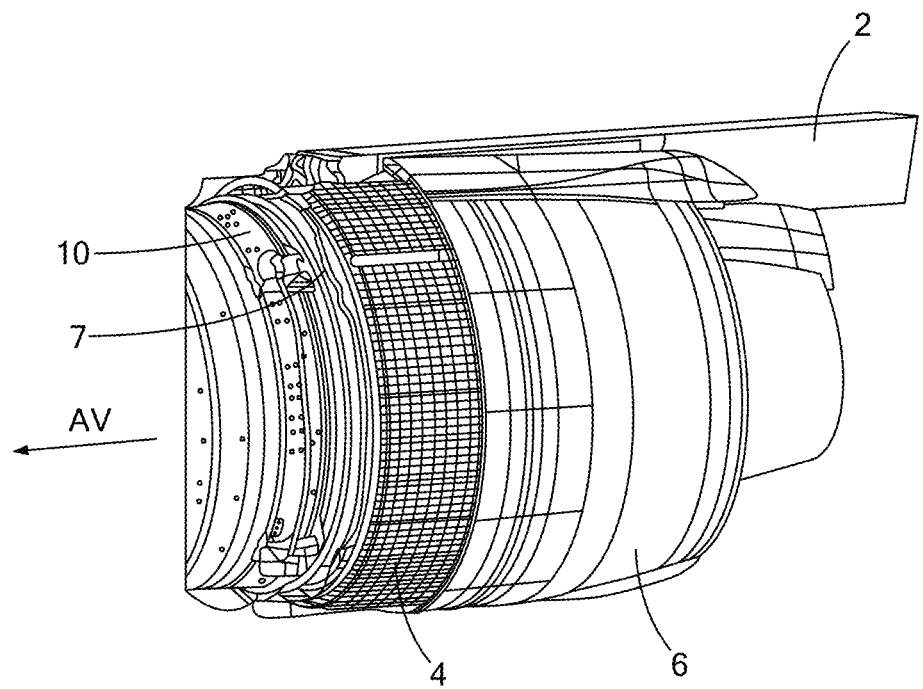
FIG. 1 is a perspective view of a turbojet engine nacelle according to the prior art, including a circular frame of the "0-Duct" type, in which the thrust reverser is closed.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a nacelle of a bypass turbojet engine supported by an engine pylon 2 disposed at the 12 o'clock position, including towards the front, which is indicated by the arrow AV, a fixed intermediate casing 10 surrounding the annular cold air flow path, which supports by actuating cylinders 7 for actuating a movable frame forming a closed rigid contour, slidably mounted on rails disposed in the vicinity of the engine pylon 2.

The movable frame supports, forwards, a succession of cascades 4 forming panels surrounding the nacelle, then rearwards, a rear cowl 6.

In the closing position of the thrust reverser, lateral air passages surrounding the cold air flow are closed by the cowl 6, the cascades 4 being inserted between the intermediate casing 10 and a front cowl of the nacelle which is not represented.

Figure 2:
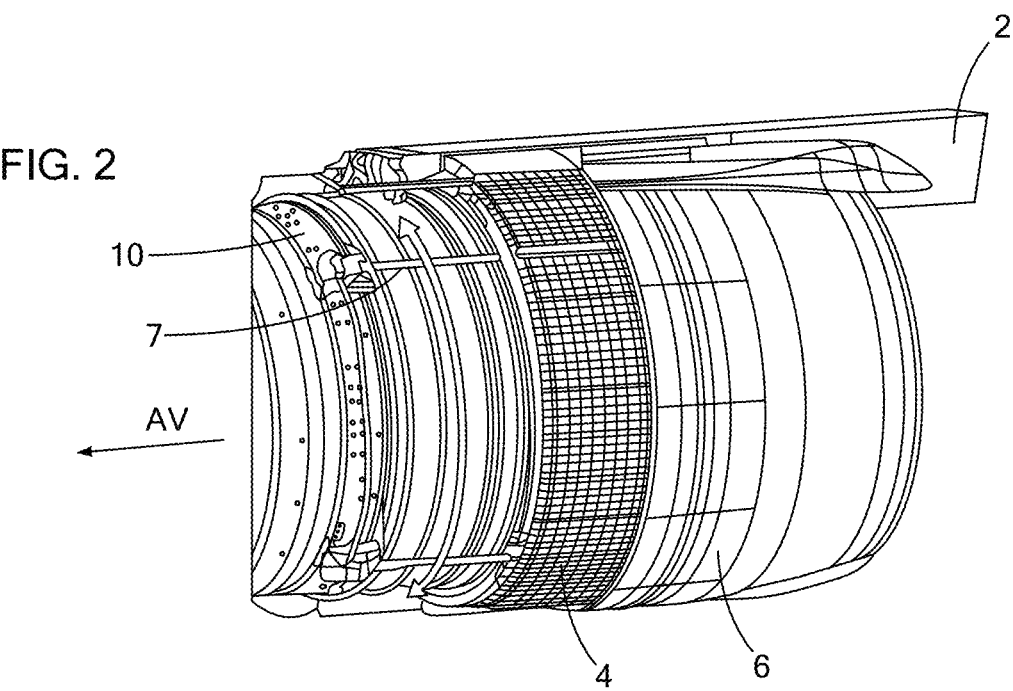
FIG. 2 is a perspective view of the turbojet engine nacelle of FIG. 1 with the thrust reverser opened.

In the opening position of the thrust reverser shown in FIG. 2, the movable frame moves back on the guide rails thereof under the effect of actuating cylinders 7, the cascades 4 coming opposite to the lateral passages, and inner flaps being deployed in the cold air flow path to direct the flow towards these cascades.

Figure 3:
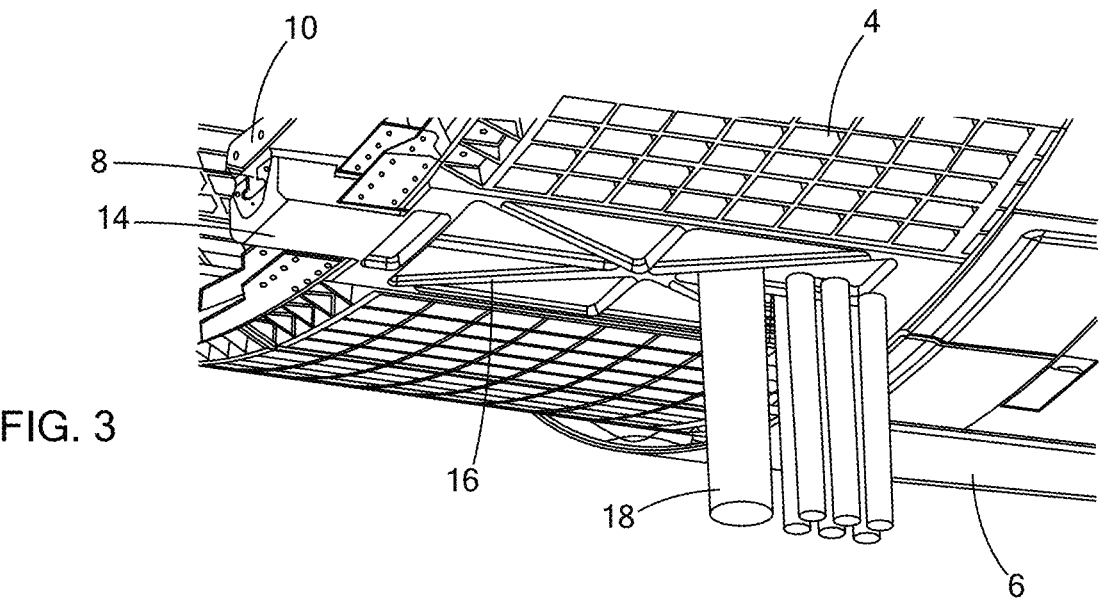
FIG. 3 is a perspective view of a portion of the turbojet engine nacelle of FIG. 1 showing the position of a passage of ancillaries that is provided below the nacelle.

FIG. 3 shows in detail the guide of the movable frame including, starting radially inwardly, a fixed rail 8 linked to the intermediate casing 10, then a movable slide rail 14 extending rearwardly by a longitudinally elongated plate 16 which is adjusted between two cascades 4.

In order to provide for a passage of ancillaries 18, such as pressurized fluid pipes, drains or electric cables, in the 6 o'clock position, vertically downwardly, it would be desirable to radially pass different pipes, drains, and electric cables of ancillaries 18 through the elongated plate 16 of the slide rail 14. In particular, the passage of ancillaries may include drains 18 for discharging fluids, disposed vertically at the bottom of the nacelle.

This arrangement cannot be simply carried out because the conduits and cables of ancillaries 18 should pass radially through the movable frame 5 equipped with the cascades 4 thereof, which slide axially during the movements of the thrust reverser.

Figure 4:
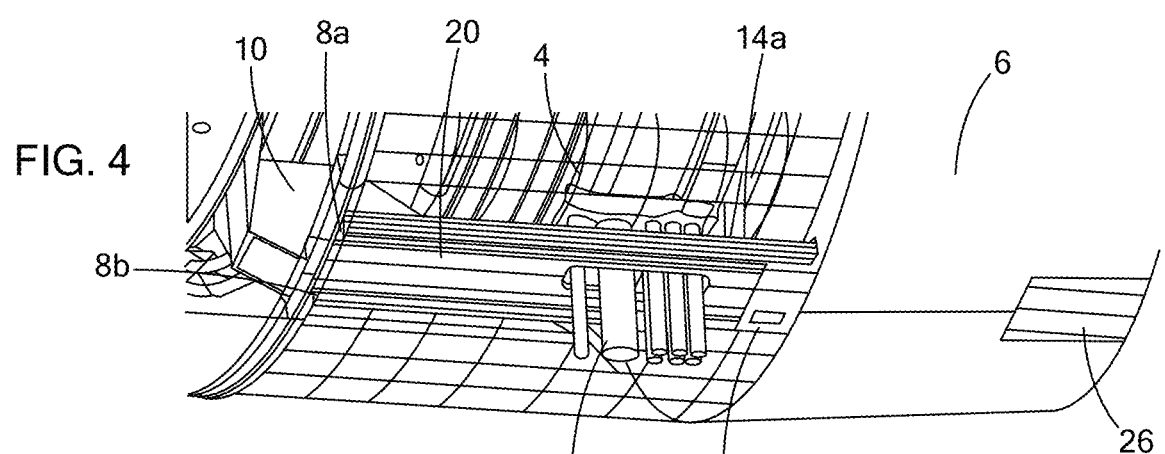
FIG. 4 is a perspective view of a portion of a nacelle according to the present disclosure, with the thrust reverser closed.

FIG. 4 shows a guide system at the 6 o'clock position of the movable frame 5 according to the present disclosure, including two guide rails 8a, 8b slightly spaced apart, each receiving a slide rail 14a, 14b. The movable frame 5 is cut according to an axial plane, each edge of this section being fastened to a slide rail 14a, 14b engaged in a rail 8a, 8b, which allows obtaining a good rigidity of this movable frame 5 by passing through the intermediate casing 10.

An elongated shutter plate 20 disposed between the two rails 8a, 8b and linked to these rails, includes a bore 21 disposed on the median axis thereof constituting a passage of the ancillaries 18. In this manner, the slide rails 14a, 14b slide on each side of the shutter plate 20, by leaving the passage of the ancillaries 18 immobile which allows making, in a simple manner, the pipes and cables of these ancillaries.

Figure 5:
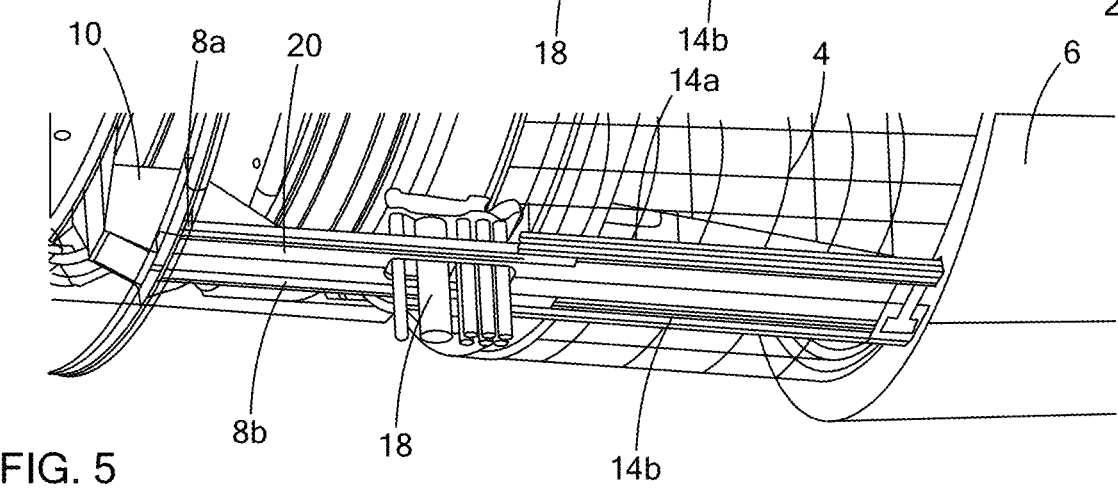
FIG. 5 is a perspective view of a portion of the nacelle according to the present disclosure, with the thrust reverser opened.

During the backward movement of the movable frame 5 shown in FIG. 5, each slide rail 14a, 14b strongly exits towards the downstream of the rail 8a, 8b thereof, by leaving at the end of the movement a small portion engaged with this rail, allowing obtaining a sufficient hold of the movable frame 5 with its equipment fastened thereon. In practice as shown in this example, for an axial stroke of 500 mm, it is possible to keep an engagement of the slide rail 14a, 14b on the rail 8a, 8b greater than 20% in order to obtain a sufficient span.

Alternatively, it is also possible to provide for inner clearances in the nacelle allowing obtaining, in the fully open position of the thrust reverser, an engagement of each slide rail 14a, 14b over the entire length of the rail 8a, 8b thereof.

The shutter plate 20 disposed parallel to the main axis of the nacelle, has a rear end 26 which extends inside the movable cowl 6, by exiting through a window of this cowl because of the rear curvature of the cowl which approaches this main axis. In addition, an aerodynamic rear appendage covering the rear window of the cowl, also called "beaver tail," in order to improve the aerodynamics of the nacelle.

In this manner, in the thrust reversal position shown in FIG. 5, the shutter plate 20, bordered by the two slide rails 14a, 14b thereof, completely closes the space disposed between the two adjacent cascades 4. The entire cold air flow rejected radially outwardly then passes through the thrust reverser cascades 4, which improves the braking thrust.

Figure 6:
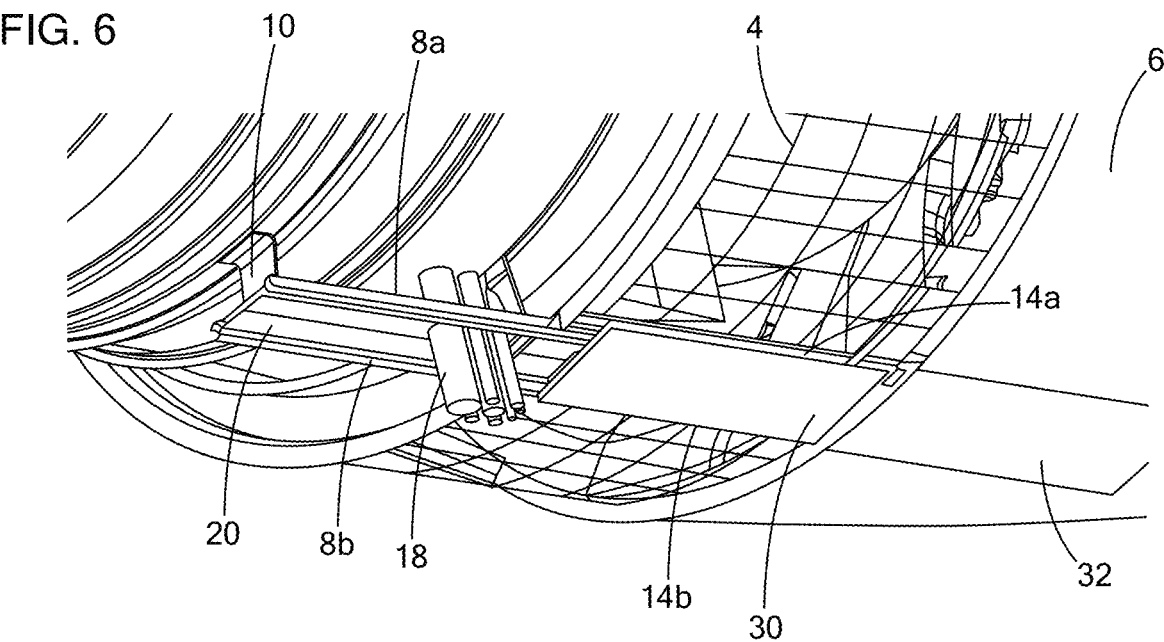
FIG. 6 shows a variant of the nacelle with the opened thrust reverser comprising a fixed outer fairing according to the present disclosure.
Figure 7:
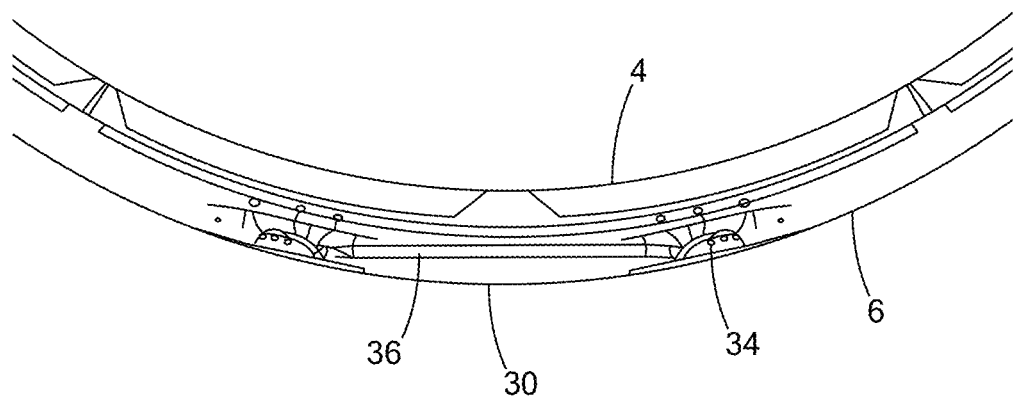
FIG. 7 is a cross-sectional view of the nacelle in a section which is downstream of the movable frame according to the present disclosure.

FIGS. 6 and 7 show a fixed outer fairing 30 forming an elongated plate disposed below the rails 8a, 8b, behind the passage of the ancillaries 18, which is fastened to the intermediate casing 10 so as to remain immobile during the sliding of the movable frame 5.

The rear cowl 6 has a forwardly open elongated window 32, corresponding to the contour of the fixed outer fairing 30, which with the open thrust reverser is disposed in alignment with this outer fairing, just behind it.

The fixed outer fairing 30 closes the passage between the two adjacent cascades when the thrust reverser is open, to improve the braking thrust. When the thrust reverser is closed, the fixed outer fairing 30 is adjusted (or shaped) in the elongated window 32 of the rear cowl 6, in order to find a good aerodynamic of the outer surfaces of the nacelle, or to conform to the outer shape of the rear cowl 6.

As shown in FIG. 7, the end of each rear cowl 6a, 6b includes locks 34 for fastening on the movable frame 5, which are unlocked to open these cowls during maintenance operations. Connecting rods 36 passing radially inside the fixed outer fairing 30 and rails 8a, 8b, connect two locks 34 which are transversely aligned when these locks are closed, to give the rear cowls 6 a good rigidity at the elongated window 32.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for a turbojet engine including a cascade thrust reverser, the nacelle comprising:
   a movable frame surrounding a cold air flow path, guided axially by longitudinal rails fastened on an intermediate casing surrounding the cold air flow path, the movable frame supporting thrust reverser cascades and rear cowls; and
   a passage of ancillaries opening radially outwardly of the movable frame in an area including no support structure passing radially through the cold air flow path, the passage of ancillaries disposed at a 6 o'clock position of the nacelle opposite to a pylon for supporting the turbojet engine,
   wherein the movable frame is cut in an axial plane at the passage of ancillaries, and each edge of a section of the movable frame is connected to the intermediate casing by a slide rail adjusted on the longitudinal rails, each of the slide rails disposed on a side of the passage of ancillaries.

2. The nacelle according to claim 1 further comprising a shutter plate closing a space between the longitudinal rails receiving the slide rails.

3. The nacelle according to claim 2, wherein the shutter plate includes a bore receiving the passage of ancillaries.

4. The nacelle according to claim 3, wherein the shutter plate extends relative to a rear of the thrust reverser cascades by a distance equal to a stroke of the movable frame.

5. The nacelle according to claim 4, wherein a rear of the rear cowls has an opening forming a passage receiving a rear end of the shutter plate when the thrust reverser is closed.

6. The nacelle according to claim 2, wherein, when the thrust reverser is being opened, the thrust reverser cascades are adjusted on the slide rails and the shutter plate is adjusted between the slide rails so as not to have a cold air radial passage outside the thrust reverser cascades.

7. The nacelle according to claim 1 further comprising a fixed outer fairing disposed rearward of the passage of ancillaries, the fixed outer fairing being adjusted on an outer shape of the rear cowls.

8. The nacelle according to claim 7 further comprising a shutter plate closing a space between the longitudinal rails receiving the slide rails, wherein the shutter plate and the fixed outer fairing form a single piece.

9. The nacelle according to claim 8, wherein the rear cowls include an elongated window receiving the fixed outer fairing when the thrust reverser is closed.

10. The nacelle according to claim 8 further comprising connecting rods passing radially inside the fixed outer fairing, each of the connecting rods connecting two locks, each of the locks fastened on an end of one of the rear cowls.

11. The nacelle according to claim 1, wherein the passage of ancillaries includes drains disposed vertically at a bottom of the nacelle.

* * * * *

UNITED STATES PATENT AND TRADEMARK OFFICE
CERTIFICATE OF CORRECTION

| | |
|---|---|
| PATENT NO. | : 11,549,462 B2 |
| APPLICATION NO. | : 16/884948 |
| DATED | : January 10, 2023 |
| INVENTOR(S) | : Sébastien Michel Thierry Guillemant et al. |

Page 1 of 1

It is certified that error appears in the above-identified patent and that said Letters Patent is hereby corrected as shown below:

On the Title Page

Item (72), please correct Inventor Name Mathieu Lerouvreur to Matthieu Lerouvreur;

Item (30), please correct Foreign Application Priority Data filing date to read Nov. 27, 2017.

Signed and Sealed this
Fourth Day of April, 2023

Katherine Kelly Vidal
*Director of the United States Patent and Trademark Office*